(12) United States Patent
Grant

(10) Patent No.: US 9,877,057 B2
(45) Date of Patent: Jan. 23, 2018

(54) ADDRESSABLE CONTENT DISTRIBUTION SYSTEMS AND METHODS

(71) Applicant: EchoStar Technologies L.L.C., Englewood, CO (US)

(72) Inventor: John Grant, Centennial, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/525,434

(22) Filed: Oct. 28, 2014

(65) Prior Publication Data

US 2016/0119665 A1 Apr. 28, 2016

(51) Int. Cl.
| | |
|---|---|
| H04N 7/025 | (2006.01) |
| H04N 21/2668 | (2011.01) |
| H04N 21/258 | (2011.01) |
| H04N 21/81 | (2011.01) |
| H04N 21/45 | (2011.01) |

(52) U.S. Cl.
CPC ... *H04N 21/2668* (2013.01); *H04N 21/25841* (2013.01); *H04N 21/25883* (2013.01); *H04N 21/25891* (2013.01); *H04N 21/4524* (2013.01); *H04N 21/4532* (2013.01); *H04N 21/812* (2013.01)

(58) Field of Classification Search
CPC .......................... H04N 21/433; H04N 21/414
See application file for complete search history.

(56) References Cited

U.S. PATENT DOCUMENTS

| | | | |
|---|---|---|---|
| 4,607,346 A | 8/1986 | Hill | |
| 5,721,827 A | 2/1998 | Logan et al. | |
| 5,758,257 A | 5/1998 | Herz et al. | |
| 5,774,170 A | 6/1998 | Hite et al. | |
| 5,790,935 A * | 8/1998 | Payton | H04N 7/17336 |
| | | | 348/E7.073 |
| 6,029,045 A | 2/2000 | Picco et al. | |
| 6,057,886 A * | 5/2000 | Van Gestel | H04N 7/025 |
| | | | 348/E7.017 |
| 6,067,107 A | 5/2000 | Travaille et al. | |
| 6,698,020 B1 * | 2/2004 | Zigmond | H04N 5/44513 |
| | | | 348/E5.102 |
| 6,876,974 B1 | 4/2005 | Marsh et al. | |
| 7,958,524 B2 * | 6/2011 | Juneau | H04L 63/1408 |
| | | | 725/104 |
| 8,719,090 B2 | 5/2014 | Lewis | |
| 2002/0083441 A1 * | 6/2002 | Flickinger | G06Q 30/02 |
| | | | 725/32 |
| 2002/0174438 A1 * | 11/2002 | Cleary | G11B 27/005 |
| | | | 725/100 |

(Continued)

*Primary Examiner* — Fernando Alcon
(74) *Attorney, Agent, or Firm* — Kilpatrick Townsend & Stockton LLP

(57) ABSTRACT

Systems and methods for providing and receiving addressable content may include an electronic device for receiving the content. The electronic device may receive a first data stream including targeting data criteria for a plurality of assets at the electronic device. The electronic device may determine a subset of the plurality of assets for storage on the electronic device. The electronic device may also receive a second data stream including the plurality of assets. The electronic device may identify each asset of the subset of the plurality of assets within the second data stream, and may store each asset of the subset of the plurality of assets at the electronic device.

18 Claims, 6 Drawing Sheets

(56) References Cited

U.S. PATENT DOCUMENTS

| | | | | |
|---|---|---|---|---|
| 2006/0013555 A1* | 1/2006 | Poslinski | ........... | H04N 5/44543 |
| | | | | 386/243 |
| 2006/0248558 A1* | 11/2006 | Barton | ................... | H04H 60/27 |
| | | | | 725/46 |
| 2011/0289522 A1* | 11/2011 | Pontual | ............ | H04N 21/23895 |
| | | | | 725/1 |

* cited by examiner

ADDRESSABLE CONTENT DISTRIBUTION SYSTEMS AND METHODS

TECHNICAL FIELD

The present technology relates to systems and methods for distributing content. More specifically, the present technology relates to addressable content distribution and reception systems and methods.

BACKGROUND

Addressable or targeted advertising allows advertisers to better access specific geographic or demographic groups as compared to conventional advertising. As more data is collected about individuals, further specificity with targeting can be employed. In this way, numerous versions of particular advertisements may be developed to address the habits or preferences of individual groups, if not individual people. However, the ways in which this content is delivered may be limited in a variety of ways. For example, content provider systems may be capable of only providing or receiving a small fraction of such advertisements, and thus only more generalized targeting may be employed.

Thus, there is a need for improved methods and systems for distributing addressable content. These and other needs are addressed by the present technology.

SUMMARY

Systems and methods for providing and receiving addressable content may include an electronic device for receiving the content. The electronic device may receive a first data stream including targeting data criteria for a plurality of assets at the electronic device. The electronic device may determine a subset of the plurality of assets for storage on the electronic device. The electronic device may also receive a second data stream including the plurality of assets. The electronic device may identify each asset of the subset of the plurality of assets within the second data stream, and may store each asset of the subset of the plurality of assets at the electronic device.

The determination operation may include comparing, at the electronic device, received targeting data criteria for each asset of the plurality of assets to stored targeting data on the electronic device. The electronic device may then determine a subset of the plurality of assets for which the targeting data criteria is satisfied by the stored targeting data. In disclosed embodiments the second data stream may include the plurality of assets as a spool of individual assets. The individual assets of the stream may each be separated by an asset identifier. The method may also include analyzing the asset identifiers as they are received in the second data stream to determine whether the following asset is part of the subset of the plurality of assets to be stored at the electronic device. In disclosed embodiments the electronic device may only store assets of the subset of the plurality of assets from the second data stream.

In disclosed embodiments, the targeting data criteria may include at least one of geographic data, demographic data, or personal viewing habits. Additionally in embodiments, the received first and second data streams are received along a unidirectional data path. The asset may include a data file that is presented by the electronic device as an advertisement. The asset may include less than 20 MB of data, and the plurality of assets may include greater than 200 assets. The electronic device may be configured to allocate a portion of memory to the storage of assets, and the portion of memory allocated may be less than the combined data size of the plurality of assets.

The present technology also includes electronic devices that may include at least one input component configured to receive one or more data streams. Electronic devices may also include at least one output component communicatively coupled with at least one display device. The electronic devices may also include one or more processors as well as memory communicatively coupled with and readable by the one or more processors, and having stored therein processor-readable instructions, which when executed by the one or more processors cause the one or more processors to receive a first data stream comprising targeting data criteria for a plurality of assets. The processors may also be caused to determine a subset of the plurality of assets for storage on the electronic device. The processors may further be caused to receive a second data stream comprising the plurality of assets, and identify each asset of the subset of the plurality of assets within the second data stream. The electronic device may then store each asset of the subset of the plurality of assets within the memory of the electronic device. In embodiments, the processors may be further caused to compare the received targeting data criteria for each asset of the plurality of assets to targeting data stored on the electronic device, and determine a subset of the plurality of assets for which the targeting data criteria is satisfied by the stored targeting data. In embodiments the electronic device may be a television receiver.

Methods are also disclosed for providing addressable content to one or more electronic devices. The methods may include broadcasting a first data stream including targeting data criteria for a plurality of assets. The methods may further include broadcasting a second data stream including the plurality of assets. In embodiments, both data streams are broadcast in parallel. The second data stream may be broadcast in a loop, and after the last asset of the plurality is broadcast, the loop may be repeated and the first asset is rebroadcast. The second data stream may include a plurality of assets in a spool of individual assets separated by an asset identifier for the following asset. The individual assets may be ordered within the stream based at least partially on geographic data associated with the assets. The second data stream may be broadcast such that at least a portion of the assets associated with a particular geographic region are received by the electronic devices in that particular geographic region at a particular time of day.

Such technology may provide numerous benefits over conventional techniques. For example, by performing the asset analysis prior to receiving the content, the electronic device may drastically reduce the number of read/write operations it performs. Additionally, by removing any requirement to store every asset broadcast, less system memory for the electronic device may be locked by the operations. This may also allow improved scaling as the number of broadcast assets may be increased over time without necessarily requiring modifications to the ways in which assets are acquired by the individual electronic devices. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
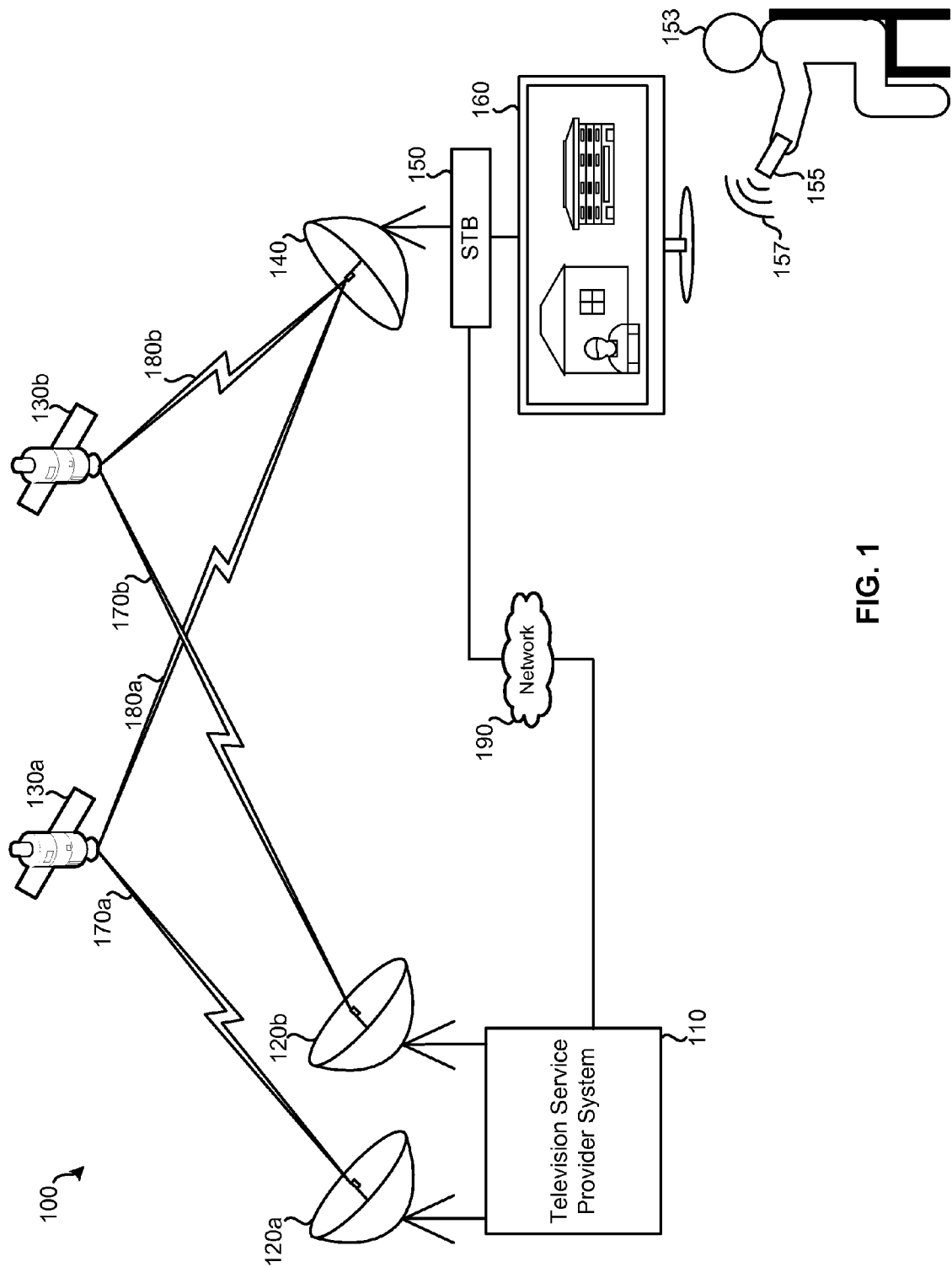
FIG. 1 shows a simplified media service system that may be used in accordance with embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology is directed to systems and methods for providing and receiving addressable content or assets. Although embodiments detailed herein are directed toward controlling television based equipment, the principles easily can be extended to other types of content and devices, such as DVD equipment, digital video recorder (DVR) equipment, video game equipment, computer equipment, handheld electronic devices, and the like. In addition, the terms "television" or "television service" can include traditional television programming, such as linear television programs, as well as other types of audio, video and/or audiovideo content, such as on-demand video content, on-demand or streaming audio content, streaming video content and the like delivered via any type of content delivery systems, such as cable, satellite, cellular/wireless, terrestrial broadcast, Internet/IP, and/or any other content delivery technology or system currently known or hereafter developed. Furthermore, embodiments herein describe set-top boxes or receivers and/or other devices being connected with a television or other device having an electronic display. However, the electronic device can also be incorporated into or be a part of the device having the display or display device, such as a television with an integrated cable, satellite, terrestrial, or IPTV receiver. Alternatively, the electronic device may be a DVR or DVD player including the present technology. The technology discussed herein additionally can be extended to any of a variety of other electronic devices, display devices, or combined devices, such as, for example, computers, tablets, hand-held mobile devices, cell phones, e-readers, personal media players, and the like. A person of ordinary skill in the art will recognize various alterations, additions, omissions, and substitutions.

In many current content distribution networks including television distribution networks, advertisements displayed during a broadcast may include one or more targeted advertisements. The targeted advertisements may be based on household data that can include geographic data, demographic data, and viewing habits of one or more people within a household. The targeted advertisements may be transmitted to individual television receivers or set-top boxes at regular intervals such as monthly, weekly, daily, hourly, etc. For example, a content distributer may provide a stream of targeted advertisements that is updated daily to all receivers within the distribution network. These advertisements can run in the thousands of advertisements updated and distributed daily, and may include local advertisements, such as for local automobile sellers, restaurants, or businesses, which can be based on geographical data, as well as national advertisements based on demographic data or individual viewing habits. For example, such advertisements can be for new television shows that may be targeted to people who tend to watch a certain amount of sports programs.

In many broadcast distribution networks, the transmission may be one-way, in that the content distributer broadcasts targeted advertisements or assets to all receivers in the distribution network, but the individual receivers are not able to transmit back along the same communication path. In such systems, because the distributer may be unable to differentiate between receivers within the region, all assets may be broadcast to every receiver within the region regardless of whether individual receivers may be desired to provide only a fraction of the broadcast assets. Additionally, many television receivers only allocate a portion of storage to these assets despite that incredible volumes of assets may be distributed across the network.

Due to both available storage space on individual receivers as well as the number of assets that are delivered daily, distribution systems may be set up to accommodate many of these limitations. To provide a reference, an exemplary conventional distribution system will be described for ease of understanding of the present technology.

A conventional system may involve packaging groups of assets into files for broadcast or transmission. Each file may be packaged as a zip file to reduce the amount of transmission data, and each zip file may include both a number of assets, say one hundred or so, as well as metadata identifying criteria for the assets contained in the file. Any number of such files may then be broadcast for reception at receivers within the distribution network.

Each receiver in the network may then receive every one of the zip files and store them in memory. As the files are in a zipped or reduced storage format, the individual receivers may be capable of storing many such files including hundreds or thousands of assets. The receivers may then unzip a first file, which will then write to a much larger volume of storage on the receiver. The receiver may then analyze the targeting criteria and compare it to stored data about the device including the specific geographic region in which the receiver is located, demographic data of the household in possession of the receiver, and viewing habits of the household or individuals of the household. For assets for which the stored targeting data matches the targeting criteria, the receiver may maintain the stored asset, and then delete the other assets of the unzipped file for which the stored targeting data does not match the targeting criteria. This may then free enough memory to open or unzip the next file of assets, and the process may be repeated until every file has been analyzed and all applicable advertisements have been stored.

Issues with such a system may include an incredible number of read/write operations performed by the individual receivers that must store and review every asset distributed by the system, which may occur on a daily basis. Additionally, the system is limited to the available memory on the device in that only so many zipped files may be stored/ analyzed before the allocated memory is over its capacity needed to unzip the files and still have space within the allocated memory both for the assets within that file, as well as the assets being stored on the receiver. In many such systems, although thousands of assets are distributed daily, only a hundred or so assets may be applicable to any individual receiver because the assets distributed include those for every region, demographic, and habit. Accordingly, such a conventional system is both inefficient in the excessive read/write operations performed, as well as scalable only up to a point where the number of distributed assets exceeds the available allocated storage in any individual receiver.

The present technology overcomes many of these limitations by reversing the storage and analysis operations as will be explained in detail below. Briefly to explain the comparison, the described conventional system stores every asset distributed, and then analyzes each one before determining if it should be maintained or deleted based on the targeting criteria. The present technology, however, first analyzes all assets being distributed, and then stores only those for which the targeting criteria are satisfied. After introducing an exemplary distribution system and individual receiving device in FIGS. 1 and 2 below, the systems, devices, and methods of performing the new technology will be described.

FIG. 1 is a simplified illustration of an embodiment of a satellite television distribution system 100. Satellite television distribution system 100 may include: television service provider system 110, satellite transmitter equipment 120, satellites 130, satellite dish 140, set-top box (STB) 150, and television 160. The television 160 can be controlled by a user 153 using a remote control device 155 that can send wireless signals 157 to communicate with the STB 150 and/or television 160. Alternate embodiments of the satellite television distribution system 100 may include fewer or greater numbers of components. While only one satellite dish 140, STB 150 and television 160, collectively referred to as user equipment, are illustrated, it should be understood that multiple (tens, thousands, millions, etc.) instances of user equipment may be connected within the data communication network 190.

Television service provider system 110 and satellite transmitter equipment 120 may be operated by a television service provider. A television service provider may distribute television channels, on-demand programming, programming information, and/or other services to users. Additionally, a television service provider may provide assets such as targeted advertisements to be distributed to one or more STBs 150. Television service provider system 110 may receive feeds of one or more television channels or audio channels from various sources. Such television channels may include multiple television channels that contain the same content, but may be in different formats, such as high-definition and standard-definition. To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots. Additionally, particular satellite dishes and or transponder streams may be utilized to provide assets as one or more streams of data.

Satellites 130 may be configured to receive signals, such as streams of television channels and/or assets, from one or more satellite uplinks such as satellite transmitter equipment 120. Satellites 130 may relay received signals from satellite transmitter equipment 120, and/or other satellite transmitter equipment, to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, transmitter equipment, and user equipment vary. Multiple satellites 130 may be used to relay television channels from television service provider system 110 to satellite dish 140. As an example, a first and second television channel may be carried on a first transponder of satellite 130a. A third, fourth, and fifth television channel may be carried using a different satellite or a different transponder of the same satellite relaying the transponder stream at a different frequency. Assets may be transmitted in similar fashion, and one or more particular transponder streams may be dedicated to delivering assets to individual satellite dishes 140. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels and/or assets via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
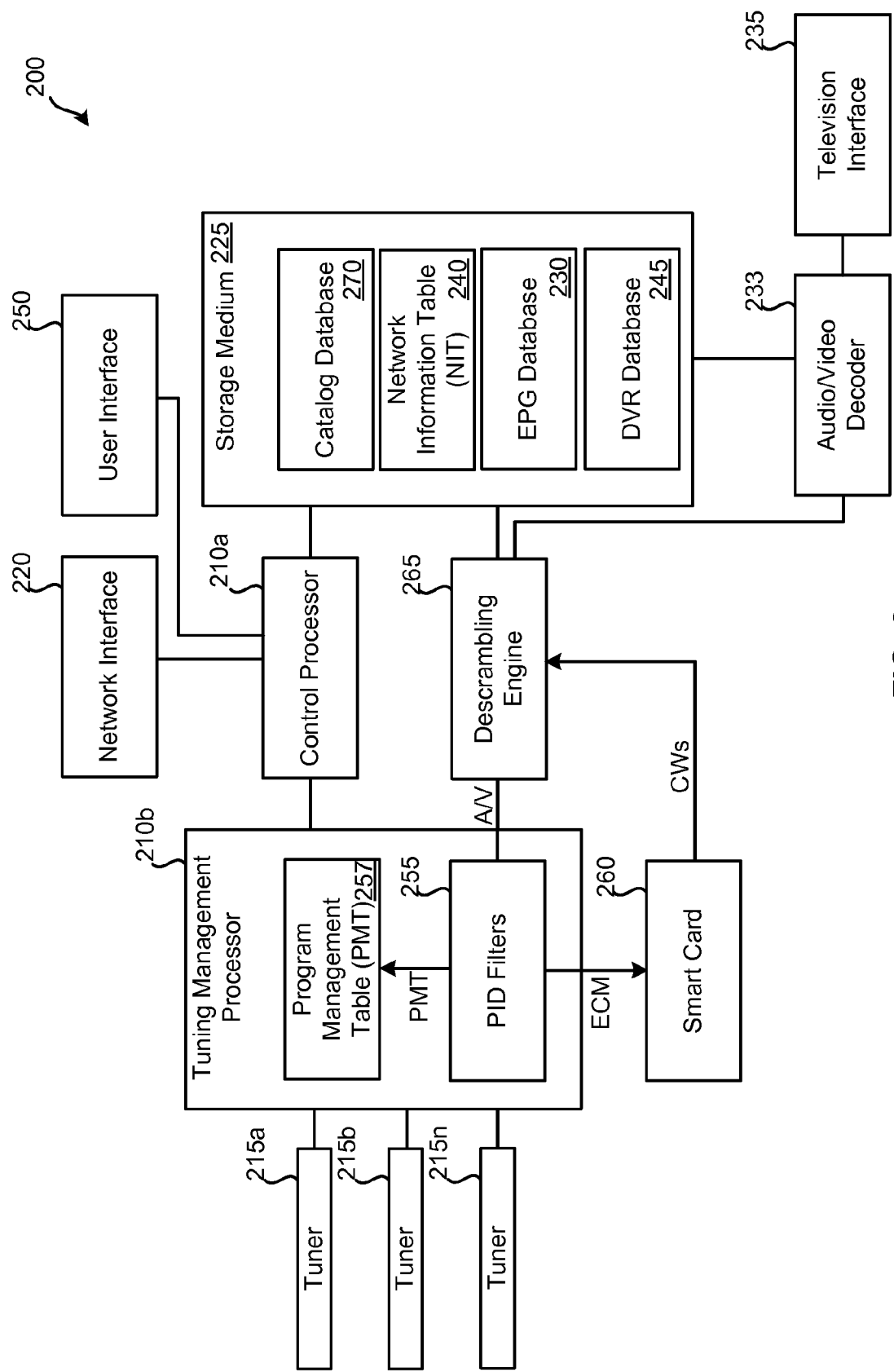
FIG. 2 illustrates an exemplary electronic device that may be used in accordance with embodiments of the present technology.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional details of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170a represents a signal between satellite uplink 120a and satellite 130a. Uplink signal 170b represents a signal between satellite uplink 120b and satellite 130b. Each of uplink signals 170 may contain streams of one or more different television channels or asset streams. For example, uplink signal 170a may contain a collection of packaged assets, while uplink signal 170b contains a grouping of television channels. Each of these television channels may be scrambled such that unauthorized persons are prevented from accessing the television channels.

Transponder stream 180a represents a signal between satellite 130a and satellite dish 140. Transponder stream 180b represents a signal path between satellite 130b and satellite dish 140. Each of transponder streams 180 may contain one or more different television channels in the form of transponder streams, which may be at least partially scrambled. For example, transponder stream 180a may include a first transponder stream containing a first group of television channels, while transponder stream 180b may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region, e.g., to distribute local television channels to the relevant market. Different television channels may be transmitted using the same frequency of the transponder stream to a different geographic region.

FIG. 1 illustrates transponder stream 180a and transponder stream 180b being received by satellite dish 140. For a group of television channels, satellite dish 140 may receive a transponder stream of transponder stream 180a; for a group of assets, a transponder stream of transponder stream 180b may be received. STB 150 may decode the received transponder stream. As such, depending on which television channel(s) are desired, a transponder stream from a different satellite, or a different transponder of the same satellite, may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190.

FIG. 1 illustrates an example of a satellite-based television channel distribution system. It should be understood, however, that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. It is also to be understood that the technology disclosed herein can be practiced on and by cable, satellite, internet-based, over-the-air, or any other system that distributes video for display.

FIG. 2 illustrates an embodiment of a television receiver 200, in accordance with certain embodiments of the present disclosure. The television receiver 200 may correspond to the television receiver or set-top box (STB) 150 of FIG. 1. In some embodiments, the receiver 200 may include more or less functionality as compared to the STB 150, and may depend at least to a certain degree on receiver to implement certain features or functionality.

Television receiver 200 may be in the form of a separate device configured to be connected with one or more display devices, such as televisions 160. Embodiments of television receiver 200 can include set top boxes (STBs). In addition to being in the form of an STB, a television receiver may be incorporated as part of another device, such as a television, other form of display device, video game console, computer, mobile phone, tablet, or the like. For example, a television may have an integrated television receiver, which does not involve an external STB being coupled with the television.

Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, network information table 240, television interface 235, digital video recorder (DVR) database 245, which may include provider-managed television programming storage and/or user-defined television programming, on-demand programming database 270, remote control interface or user interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a, which may also provide commands to tuning management processor 210b that indicate television channels to be output to decoder module 233 for output to a display device.

Tuners 215 may include one or more tuners used to tune to transponders that include broadcasts of one or more television channels and/or asset streams. In some embodiments, two, three, or more than three tuners may be present, such as four, six, or eight tuners or more. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. In disclosed embodiments, tuner 215 may include a full-band tuner configured to receive the whole broadcast band on a single tuner. If multiple television channels transmitted on the same transponder stream are desired, a single tuner of tuners 215 may be used to receive the signal containing the multiple television channels for presentation and/or recording. Tuners 215 may receive commands from tuning management processor 210b. Such commands may instruct tuners 215 to tune to certain frequencies. In some embodiments, the key combination database and/or remote control lock rules are stored and processed by the remote control.

Network interface 220 may be used to communicate via an alternate communication channel with a television service provider, if such communication channel is available. Storage medium 225 may represent one or more non-transitory computer-readable storage mediums. Storage medium 225 may include memory and/or a hard drive. Storage medium 225 may be used to store information received from one or more satellites, via a cable network, via some other form of television service provider network, and/or information received via network interface 220. Storage medium 225 may store information related to EPG database 230, DVR database 245, and/or on-demand programming 270, as well as assets received over one or more of the networks. EPG database 230 may store information related to television channels and the timing of programs appearing on such television channels. The network information table (NIT) 240 may store information used by television receiver 200 to access various television channels. NIT 240 may be stored using storage medium 225. Decoder module 233 may serve to convert encoded video and audio into a format suitable for output to a display device.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 270 and/or information from EPG database 230, to a television for presentation. Television interface 235 may also serve to output a CVM. Television interface 235 may be configured to be connected with multiple display devices. Therefore, different video feeds may be presented via different display devices. Television interface 235 may also be configured to output multiple, e.g., 3, 3, 4, 5, 6, etc., video streams to a single display device for simultaneous presentation. Digital Video Recorder (DVR) functionality may permit a television channel to be recorded for a period of time. DVR database 245 may also be used to record recordings of service provider-defined television channels or assets. For each day, an array of files may be created. For example, based on provider-defined timers, a file may be created for a collection of targeted assets received, e.g. daily, at the STB. User interface 250 may receive communications from one or more remote controls that allow a user to interact with television receiver 200. Security device 260, which may be implemented as a smart card, may be used for decrypting incoming data. Tuning management processor 210b may be in communication with tuners 215 and control processor 210a. From tuners 215, tuning management processor 210b may receive transponder streams of packetized data. PID filters 255 may be configured to filter data packets based on PIDs. Depending on a television channel selected for recording/viewing, a PID filter may be created to filter the video and audio packets associated with the television channel, based on the PID assignments present in PMT 257.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer systems disclosed further herein.

While the television receiver 200 has been illustrated as a satellite receiver, it is to be appreciated that techniques below may be implemented in other types of television receiving devices, such as cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. Further, as previously detailed, the electronic device that interacts with the remote control may be some other type of device entirely.

Figure 3:
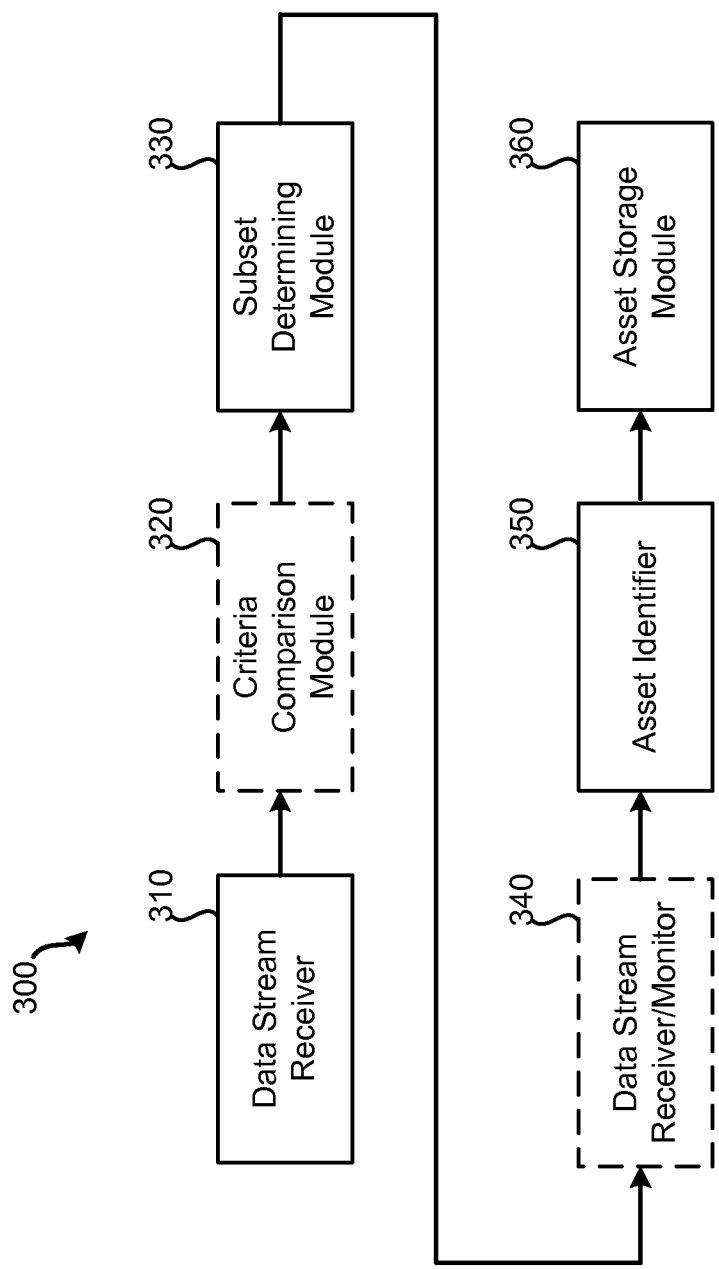
FIG. 3 illustrates modular components that may be used in accordance with embodiments of the present technology.

FIG. 3 is an illustration of an embodiment of modular components of an application 300 that may include hardware, software, firmware or any such combination, which may be used to perform the present technological functions. In disclosed embodiments, application 300 may include more or less modules, and the modules may additionally be separated into multiple modules, or the modules may be combined. The modules may additionally be aspects of more than one application run by one or more processors, such as processors 210 of device 200, or processors 610 described below. The application may be stored in memory such as memory 635 as described in detail below. In this embodiment, the modules may be run concurrently, in differing order, or without one or more of the specified modules in order to perform the technological functions described herein. The modules of application 300 will be discussed in reference to a television receiver or STB 200 as previously described, but it is to be understood that the application 300 may be incorporated with a variety of other electronic devices including a DVR, DVD player, television, computer, tablet, or hand-held device.

An electronic device, such as STB 200 as previously discussed with respect to FIG. 2, may include at least one input component configured to receive assets, such as from television service provider 110. Although the term asset can technically be applied to any type of data element that is being delivered or received by the present technology, the term asset is most generally being applied to cover a physical file that may be transformed and output to a display as an advertisement or commercial, which can include thirty-second advertisements, including longer and shorter dynamic content, as well as frames or images of advertising data. The electronic device may be directly coupled with the display device or otherwise in communication with the device such that audio and/or video data may be transmitted wirelessly, for example. The STB 200 may also be configured with multiple output components, which may be configured to provide audio and/or video data to multiple display devices. The STB 200 may send a main video as received from the service provider to the main display device, such as television 160, and also send an additional video data stream to an additional display device, such as a laptop, smartphone, or other device capable of receiving a video display (not shown).

The electronic device may include one or more processors, as well as memory, that coordinate to perform the application 300. In operation, data stream receiver 310 may receive one or more data streams that may include a first data stream. The first data stream received may include targeting data criteria for a plurality of assets that may be received on the data stream, or on an alternative or additional data stream. An optional criteria comparison module 320 may utilize the criteria to determine a subset of the plurality of assets for storage on the electronic device.

The comparison may involve utilizing data stored on the electronic device, such as in communicatively-coupled memory. The memory may store one or more types of targeting data for use by the one or more modules. For example, the stored targeting data may include the geographical location associated with the electronic device or in which the electronic device is located. The stored data may include demographic data about the household or location at which the device is located. For example, the data may include gender, ethnicity, socioeconomic, or other data useful for targeting advertisements. The stored data may also include viewing habits associated with the electronic device. For example, individual or collective viewing habits may be stored on the electronic device that include amount and/or type of content viewed through the electronic device. The habits may include the time of day during which the device is in use, types of programming watched, including sports, political, on-demand, movies, etc., as well as the frequency of time-shifting activities versus live viewing, among a host of other habits that would be understood to be included.

The Criteria Comparison Module 320 may access this stored targeting data and compare it to the received targeting data criteria to identify assets satisfying the criteria. A subset determining module 330 may then be used to determine a subset of the plurality of assets being provided for which the targeting data criteria is satisfied, and that may be used for collection of the individual assets, and for storage of the assets on the electronic device. The module may produce a list, table, or other format for use in identifying assets that are within the subset.

An optional data stream receiver or monitor 340 may be used to receive a second data stream that includes the plurality of assets themselves. The receiver 340 may be optional and may be the same or a different receiver than data stream receiver 310. Although described as being received, the second data stream may not be stored on the electronic device as it is received. For example, the targeting data criteria received from the first data stream may be stored and used for determining the subset of the plurality of assets. The second data stream including all of the plurality of assets, however, may be monitored as it is broadcast in order to preserve allocated memory of the electronic device.

Optional receiver/monitor 340 may work with asset identifier 350 to identify each asset of the subset of the plurality of assets within the second data stream containing the plurality of assets. The assets may be identified by identification information transmitted with, prior to, or in some other fashion from the plurality of assets. For example, the assets may be spooled along with their identification information that may be monitored by module 340. When identification information corresponding to an asset that is part of the subset is identified by module 350, asset storage module 360 may record or otherwise store the asset within the memory of the electronic device. This process may then be continued until each asset of the subset of the plurality of assets have been stored on the electronic device. The modules in operation may allow the electronic device to track assets being broadcast without recording every one and then analyzing it on the device to determine if it is within the subset. In this way, read/write operations may be reduced, and the allocated memory of the storage device may be utilized specifically to record the subset of the plurality of assets identified. Various other aspects of the operation of the present technology will be described in further detail below, any of which may be performed by one or more modules of the electronic device.

Figure 4:
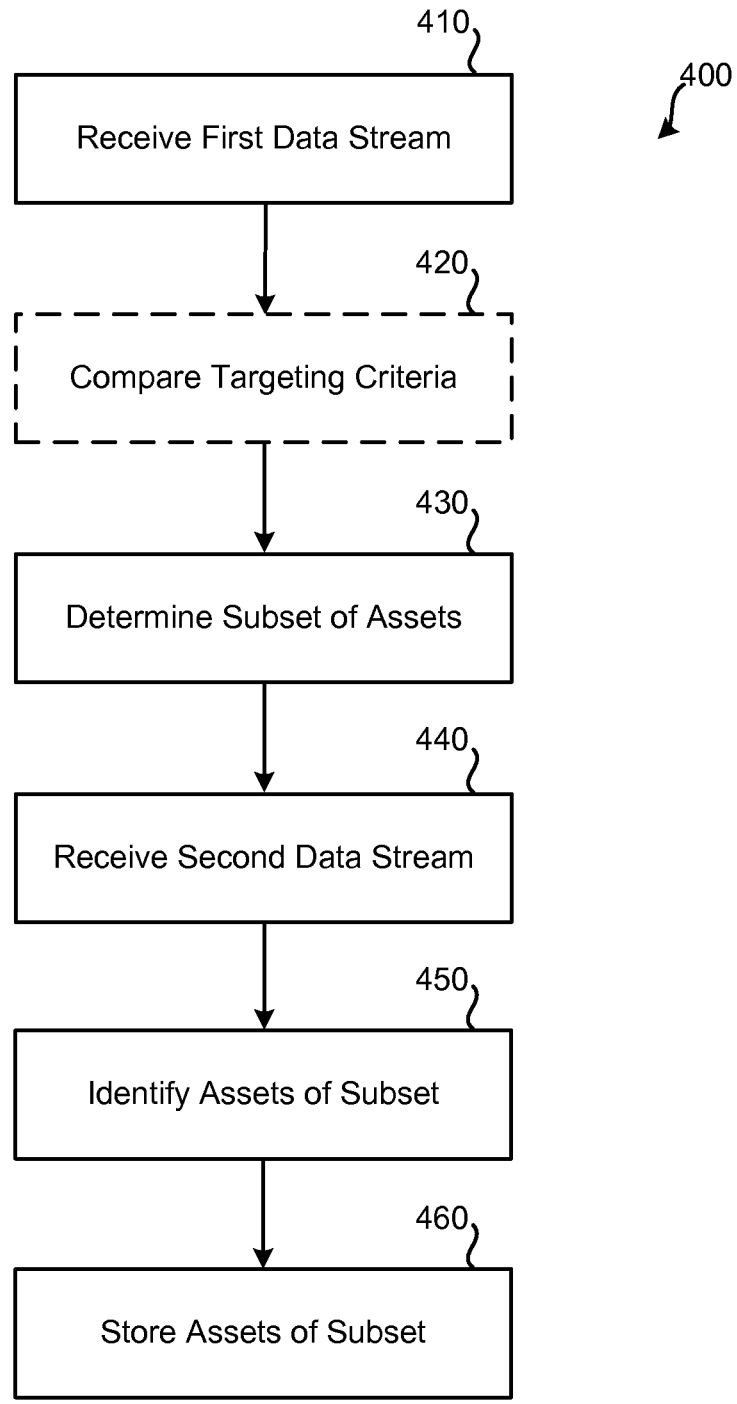
FIG. 4 shows a simplified flow diagram of a method receiving addressable content according to embodiments of the present technology.

The systems and devices previously described may be used in performing various methods. The methods may also be represented by programming stored in memory of a computing device. Additionally, any operation discussed may be performed by one or more modules of application 300 described above with regard to FIG. 3. FIG. 4 illustrates an embodiment of a method 400 for receiving addressable content. Method 400 may be performed using any of the systems or components previously described. Method 400 may allow for an electronic device to analyze targeting criteria for a plurality of assets before monitoring an asset stream and retrieving particular assets. Each step of method 400 may be performed at or by a single electronic device, such as an STB, television receiver, computer, or mobile device, for example, or by multiple devices communicating with one another. Means for performing each step of method 400 include an electronic device and/or the various components of an electronic device or distribution system, such as those detailed in relation to FIGS. 1 and 2. Method 400 may be performed using a computerized device, such as a device incorporating some or all of the components of computer system 600 of FIG. 6.

The electronic device utilized in the technology may be a television receiver or set-top box as previously described, and may include at least one input component configured to receive one or more data streams including metadata and/or assets. The electronic device may also include at least one output component communicatively coupled with at least one display device, such as previously described. The electronic device may receive a first data stream 410 that includes targeting data criteria for a plurality of assets. The electronic device may then determine a subset of the plurality of assets for storage on the electronic device at operation 430, which may optionally include comparing the received targeting data criteria to stored targeting data at operation 420.

The electronic device may also receive a second data stream at operation 440 that includes the plurality of assets. The device may identify each asset of the subset of the plurality of assets within the second data stream at operation 450, and may store each asset of the subset of the plurality of assets at the electronic device at operation 460. In this way, the electronic device may perform an analysis of the plurality of assets before storing any, and determine which of the plurality apply to that electronic device. The device may then only store the applicable assets as opposed to storing every broadcast asset, and then reviewing, storing and/or deleting each asset that has been broadcast. Such a configuration may be useful in a number of situations, including where each individual electronic device is configured to allocate a portion of memory to the storage of assets, and the portion of memory allocated is less than the combined data size of the plurality of assets. For example, each asset may be less than or about 10 megabytes (MB) in size, or may be more than 10, 20, 30, 50, 500 MB, etc. in size or greater. The electronic device may have allocated a portion of memory of any varying size, e.g. a few gigabytes (GB), for the storage of such assets, and may be able to store 10, 100, 1,000, etc. or more assets up to the limit of the allocated memory. The number of assets being broadcast during a particular time period, however, may be up to or greater than 100, 200, 1,000, 5,000, 10,000, etc. or more, such that an individual electronic device is incapable of storing every asset for review and analysis.

Each asset being distributed may be provided originally or be reviewed to produce criteria for targeting. These criteria may be included as metadata, or may be prepared in some file format that may be transmitted or broadcast. The first data stream may include or may specifically be the metadata for an entire population of assets that are being distributed over a given period, e.g. a day. These criteria may include any number of restrictions for displaying the asset including geographic requirements, demographic requirements, or viewing habit such as personal viewing habit requirements of users associated with the electronic device. The criteria may be stored in a variety of transmittable formats or transformed into a format for transmission. The first data stream may be transmitted over a period of time including up to twenty-four hours per day. In this way, either while the device is in use or while in a standby mode, the device may access the first data stream and retrieve the current criteria for storing and displaying assets being transmitted. This operation may be performed as often as assets may be updated, such as once per day, week, hour, etc. in order to maintain a current rotation of assets at each individual electronic device.

Once the electronic device has acquired the targeting data criteria from the first data stream, which may, for example, be a relatively small file of information merely including text data of the requirements or criteria for each asset, the electronic device may perform an analysis. This analysis may be performed before any assets have been received by the electronic device. The electronic device may compare the received targeting data criteria for each asset of the current population or plurality of assets to stored targeting data on the electronic device. The electronic device may have stored a variety of targeting data, which may be used to identify a subset of the plurality of assets for storage and presentation to users of the individual electronic device.

For one non-limiting example, the criteria for a particular asset X may include viewers in the state of Colorado that typically watch more than 2 hours of sports programming per week. The asset itself may be an advertisement, for example, related to any number of programs, products, or services that have been matched to particular criteria and would be understood as related. The electronic device may determine that the device is located in Denver, Colo., and users of that device average between 5 and 10 hours of sports programming per week. The electronic device may then determine that the criteria for asset X has been met, and the electronic device may note or add asset X to a list of assets being broadcast that are to be recorded on this particular electronic device. The device may then review the next asset in the list until each and every asset criteria has been analyzed. In this or a similar way, the electronic device may develop or determine a subset of the plurality of assets for which the targeting data criteria is satisfied by the stored targeting data. This process may be performed at any time of day, or on a regular basis in order to maintain a current list of assets that are to be stored on a particular electronic device.

The list or subset of the plurality of assets for which the targeting data criteria has been satisfied may then be used by the electronic device to acquire or retrieve the individual assets of the subset. The second data stream may be received on the same or an alternate tuner, or a tuner may be switched from the first data stream to the second data stream to acquire the subset of assets. In embodiments, the electronic device may monitor the second data stream to identify the particular assets of the subset previously developed. Once an asset of the subset has been identified, the electronic device may retrieve or acquire that particular asset from the plurality. This may then be repeated until each asset in the subset has been acquired for the time period, such as that day.

The assets may be provided and received in a variety of ways that allows the electronic device to acquire the assets of the subset identified. For example, the second data stream may include or consist of the plurality of assets. The assets may be spooled in the second data stream in any way, and in one embodiment may be spooled individually in the stream, as in each asset is broadcast one after another within the stream. The individual assets within the stream may also be separated by an asset identifier indicating which asset is following the identifier. For example, the second data stream may be organized in many ways, including an asset identifier, followed by the asset identified, followed by another asset identifier, asset identified, etc. The identifier may simply be a tag or some other mechanism by which an individual electronic device may be able to determine whether to acquire the asset as part of an identified subset. Such a process could appear to an electronic device to look like an information tag or identifier, e.g. [ID for Asset XXYY], followed directly by the particular asset, e.g. [Asset XXYY].

The electronic device may then monitor such an exemplary second data stream over the course of the spooled assets to retrieve the particular assets. The electronic device may analyze the asset identifiers as they are received at the electronic device in the second data stream. The device may then determine whether the following asset is part of the subset of the plurality of assets to be stored at the electronic device. By performing the analysis before any assets are retrieved, and then identifying assets to be stored on the electronic device as the assets are spooled in the second data stream, the electronic device may only store assets of the subset of the plurality of assets from the second data stream. This may also allow reduced packaging on the distribution side because allocated memory on the electronic devices need not be managed for an entire asset population. The stored assets may then be utilized by the electronic device during normal operation. The assets may be data files that are then presented by the electronic device as an advertisement during regular viewing. Unlike conventional technologies in which every asset is first acquired and then the electronic device determines whether it should be retained, electronic devices in the current technology can also predict, based on the known asset identifiers within a stored subset, when the particular assets of the subset are likely to be broadcast for acquisition. For example, if the assets are organized in an ascending numerical fashion, and a device tunes to the second data stream when it is on asset 234, and the electronic device has identified in its subset asset 240, the electronic device can recognize the relative time between the current asset on the second data stream and the next asset identified in the subset.

Such an operation may be particularly helpful where the received first and second data streams are received along a unidirectional data path. Unlike many Internet based targeted advertising methods, the electronic device in the present technology may be unable to provide feedback to the provider. For example, in many computer applications over the internet, targeting data may be collected by the provider for an individual computer via an IP address alone. In this way, the collection of assets need not be broadcast because a conversation can occur between the provider and electronic device so that a specific targeted advertisement may be provided to a particular device at any time. Because a broadcast system, such as a television broadcast system, may not be capable of identifying particular receivers before the assets are transmitted, providing the analytic capabilities of the present technology at the device level can reduce inefficiencies in a system in which each electronic device may receive similar content throughout the day regardless of location. As would be understood, a variety of other configurations may be performed that are encompassed by this technology and recognizable from these non-limiting examples.

Figure 5:
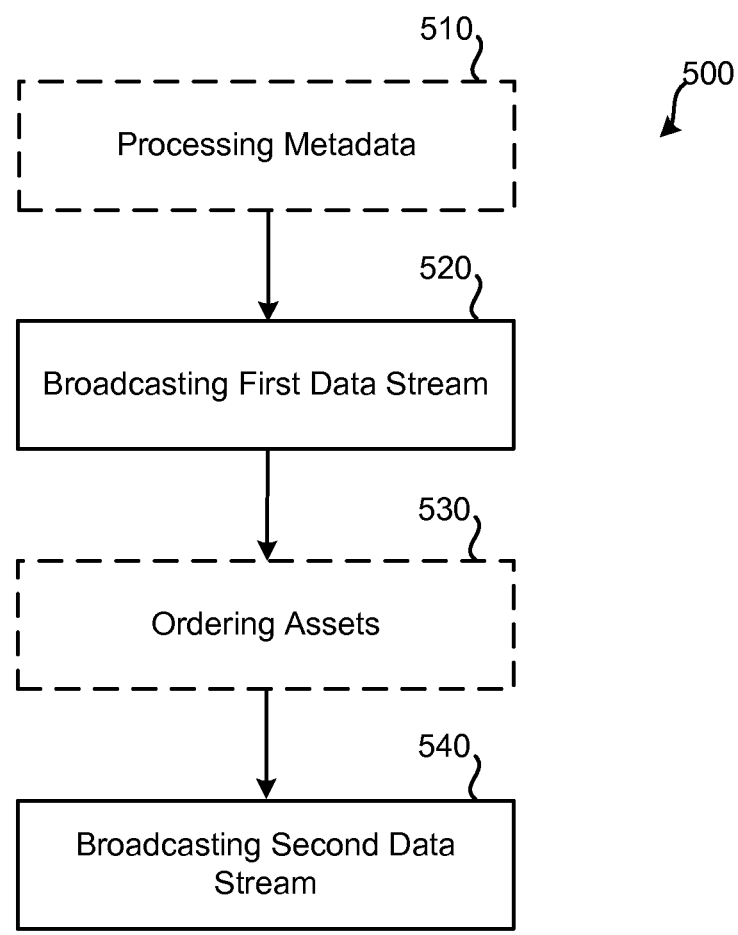
FIG. 5 shows a simplified flow diagram of a method of providing addressable content according to embodiments of the present technology.

FIG. 5 illustrates an embodiment of a method 500 for providing addressable content according to the present technology. Method 500 may be performed using any of the systems or components previously described. Method 500 may allow for a distribution network to provide addressable content in a way by which individual receivers are able to retrieve only a portion of the addressable content. Each step of method 500 may be performed by or at a content distributor system, a content distributor, a satellite uplink, a satellite, etc., or may be performed with more than one device in communication with one another. Means for performing each step of method 500 include devices and/or the various components of a distribution system, such as those detailed in relation to FIGS. 1 and 2, and method 500 may include some or all of the technology and functionality discussed in method 400, and vice versa. Method 500 may be performed using a computerized device or component, such as a device incorporating some or all of the components of computer system 600 of FIG. 6.

A content distributor may receive assets from a variety of sources, producers, or developers. The assets may include targeting criteria as metadata with the file, as a separate file, or may be determined at the content distributor. At optional operation 510, the targeting criteria may be processed into a broadcast or transmittable first data stream, such as, for example, an MPEG-2 transport stream format, although any other known or developed format may be used. The first data stream may be broadcast at operation 520, where the first data stream includes or consists of the targeting data criteria for a plurality or population of assets. The data stream may be broadcast to any number of receiving devices that are configured to retrieve the targeting data criteria for analysis as previously described.

The assets themselves may be ordered or organized into a broadcast or transmittable second data stream at optional operation 530. Each asset may be in a variety of formats, such as, for example, MPEG-2SD, but other standards including H.264 or any other format may be used. The assets may be organized in a variety of ways, but in an embodiment the assets are organized in an individual order separated by asset identifiers for the following asset located between each individual asset. The second data stream of ordered assets may be broadcast at operation 540, wherein the second data stream includes the individual assets as a spool.

The first and second data streams may be broadcast in any known or developed way, but may be broadcast in parallel on different transponder streams or frequencies. In embodiments the streams may be broadcast twenty-four hours a day. In this way, any particular electronic device may access both the targeting data criteria and/or the plurality of assets at any time. Based on the number of assets in the population, the second data stream may require a certain amount of time to spool the entire asset set, for example, minutes or hours. The second data stream may be broadcast in a loop, such that after the last asset of the plurality is broadcast the loop is repeated and the first asset is rebroadcast. This may continue all day, and may be updated at any time with additional assets for incorporation.

The assets may also be ordered in any way to provide ease of acquisition by electronic devices. For example, individual assets may be ordered within the stream based at least partially on geographic data associated with the assets. For instance, if a particular geographic region has ten associated assets, these assets may be grouped in a block within the stream to allow electronic devices within that region to acquire those assets in one block as opposed to waiting for the entire stream to spool. Continuing such an example, the stream can also be broadcast such that at least a portion of the assets associated with a particular geographic region are received by electronic devices in that particular geographic region at a particular time of day. In so doing, regional assets can be provided over a region during times of best access, such as early in the morning, or other off-peak times. As would be understood, any number of other organization schemes can be utilized, all of which are encompassed by the present technology.

Figure 6:
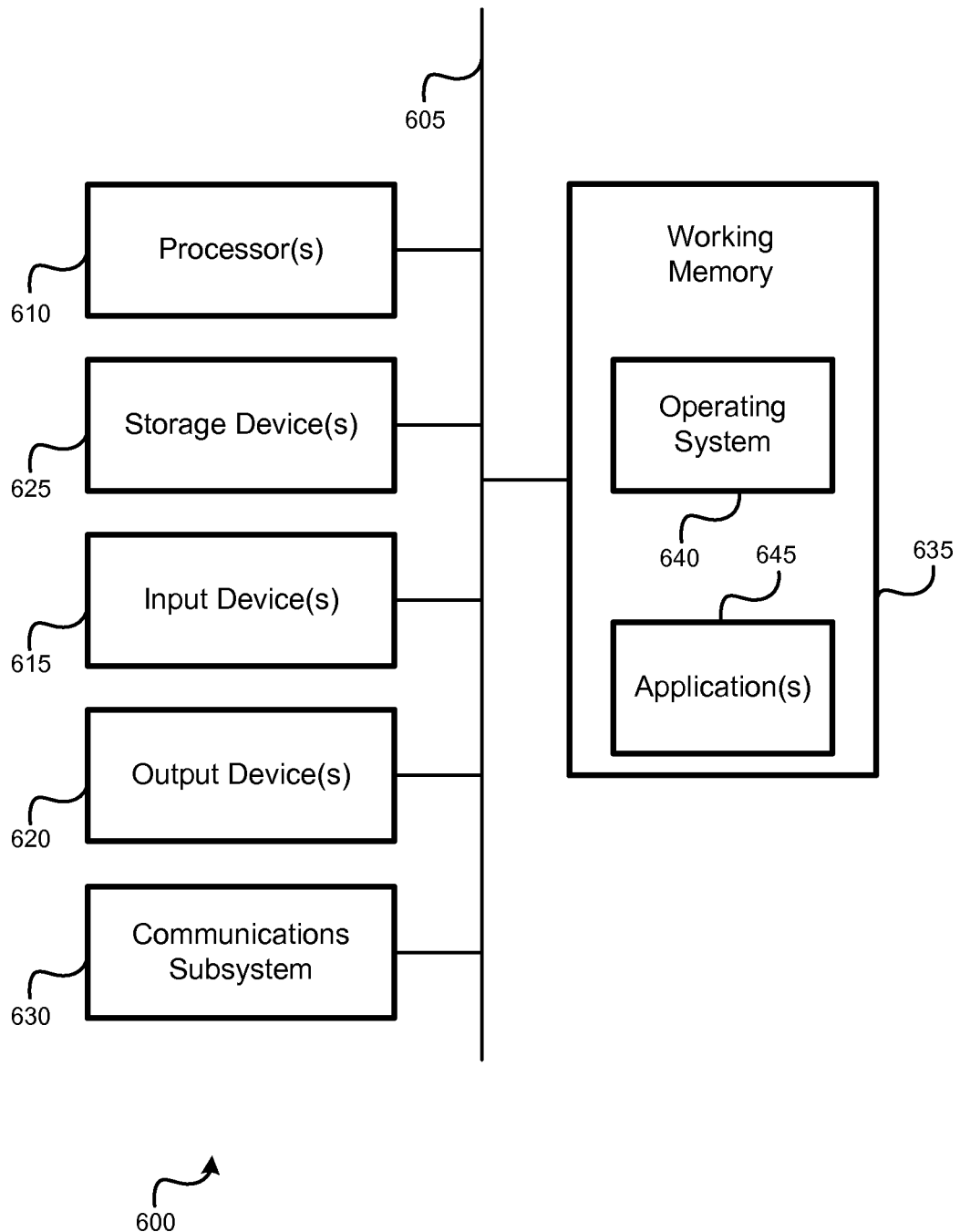
FIG. 6 shows a simplified computer system that may be utilized to perform one or more of the operations discussed.

FIG. 6 illustrates an embodiment of a computer system 600. A computer system 600 as illustrated in FIG. 6 may be incorporated into devices such as an STB, a first electronic device, DVR, television, media system, personal computer, and the like. Moreover, some or all of the components of the computer system 600 may also be incorporated into a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device or STB, as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 4 and 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of receiving addressable content at an electronic device, the method comprising:
    receiving a first data stream comprising targeting data criteria for a plurality of assets at the electronic device, wherein an asset comprises a data file that is presented by the electronic device as an advertisement, wherein the targeting data criteria defines for each asset of the plurality of assets at least one of geographic data, demographic data, or personal viewing habits criteria to be met at the electronic device to extract each asset from the plurality of assets, and wherein the targeting data criteria comprises a frequency of time-shifting activities versus live viewing for the electronic device;
    determining, at the electronic device, a subset of the plurality of assets for storage on the electronic device;
    receiving a second data stream comprising the plurality of assets at the electronic device, wherein the first data stream and second data stream are broadcast on parallel satellite broadcast streams;
    identifying each asset of the subset of the plurality of assets within the second data stream; and
    storing each asset of the subset of the plurality of assets at the electronic device.

2. The method of claim 1, wherein the determination comprises:
    comparing, at the electronic device, the received targeting data criteria for each asset of the plurality of assets to stored targeting data on the electronic device; and
    determining a subset of the plurality of assets for which the targeting data criteria is satisfied by the stored targeting data.

3. The method of claim 1, wherein the second data stream comprises the plurality of assets as a spool of individual assets.

4. The method of claim 3, wherein the individual assets of the second data stream are each separated by an asset identifier.

5. The method of claim 4, further comprising:
    analyzing the asset identifiers as they are received in the second data stream to determine whether a following asset is part of the subset of the plurality of assets to be stored at the electronic device.

6. The method of claim 1, wherein the electronic device only stores assets of the subset of the plurality of assets from the second data stream.

7. The method of claim 1, wherein the received first and second data streams are received along a unidirectional data path.

8. The method of claim 1, wherein an asset comprises less than 20 megabytes of data, and wherein the plurality of assets comprises greater than 200 assets.

9. The method of claim 1, wherein the electronic device is configured to allocate a portion of memory to storage of assets, and wherein the portion of memory allocated is less than a combined data size of the plurality of assets.

10. An electronic device comprising:
    at least one input component configured to receive one or more data streams;
    at least one output component communicatively coupled with at least one display device;
    one or more processors; and
    memory communicatively coupled with and readable by the one or more processors and having stored therein processor-readable instructions, which when executed by the one or more processors cause the one or more processors to:
  receive a first data stream comprising targeting data criteria for a plurality of assets, wherein an asset comprises a data file that is presented by the electronic device as an advertisement, wherein the electronic device accesses the first data stream while in standby mode via a tuner of the electronic device, and wherein the targeting data criteria comprises a frequency of time-shifting activities versus live viewing for the electronic device;
  determine a subset of the plurality of assets for storage on the electronic device;
  receive a second data stream comprising the plurality of assets by switching the tuner from the first data stream to a second data stream;
  identify each asset of the subset of the plurality of assets within the second data stream; and
  store each asset of the subset of the plurality of assets within the memory of the electronic device.

11. The electronic device of claim 10, wherein the processors are further caused to:
  compare the received targeting data criteria for each asset of the plurality of assets to targeting data stored on the electronic device; and
  determine a subset of the plurality of assets for which the targeting data criteria is satisfied by the stored targeting data.

12. The electronic device of claim 10, wherein the electronic device comprises a television receiver.

13. A method of providing addressable content to one or more electronic devices, the method comprising:
  broadcasting a first data stream comprising targeting data criteria for a plurality of assets, wherein an asset comprises a data file that is presented by the electronic device as an advertisement, wherein the targeting data criteria defines for each asset of the plurality of assets at least one of geographic data, demographic data, or personal viewing habits criteria to be met at the electronic device to extract each asset from the plurality of assets, and wherein the targeting data criteria comprises a frequency of time-shifting activities versus live viewing for the electronic device; and
  broadcasting a second data stream comprising the plurality of assets, wherein the first data stream and second data stream are broadcast on parallel satellite broadcast streams.

14. The method of claim 13, wherein the second data stream is broadcast in a loop, wherein after a last asset of the plurality is broadcast the loop is repeated and a first asset is rebroadcast.

15. The method of claim 13, wherein the second data stream comprises the plurality of assets as a spool of individual assets separated by an asset identifier for the following asset.

16. The method of claim 15, wherein the individual assets are ordered within the second data stream based at least partially on geographic data associated with the assets, and wherein the second data stream comprises all assets for all geographic regions.

17. The method of claim 16, wherein the second data stream is broadcast such that at least a portion of the assets associated with a particular geographic region are received by electronic devices in that particular geographic region at a particular time of day.

18. The method of claim 1, wherein each asset comprises an asset identifier, wherein the asset identifiers are organized in ascending numerical fashion, and wherein the method further comprises:
  predicting, by the electronic device, when at least one asset of the subset of the plurality of assets within the second data stream will be received based on a numerical difference between an asset identifier of a currently broadcast asset, and an asset identifier for the at least one asset of the subset of the plurality of assets.

* * * * *